Nov. 26, 1957  W. J. D. VAN DIJCK  2,814,552
RECIPROCATING COMPRESSION-REACTOR FOR SHORT
PERIOD, HIGH TEMPERATURE AND HIGH
PRESSURE CHEMICAL REACTIONS
Filed Jan. 8, 1951  2 Sheets-Sheet 1

Inventor: Willem J. D. Van Dijck
By: *Oswald H. Wilmore*
His Attorney

Nov. 26, 1957
W. J. D. VAN DIJCK
2,814,552
RECIPROCATING COMPRESSION-REACTOR FOR SHORT
PERIOD, HIGH TEMPERATURE AND HIGH
PRESSURE CHEMICAL REACTIONS
Filed Jan. 8, 1951
2 Sheets-Sheet 2
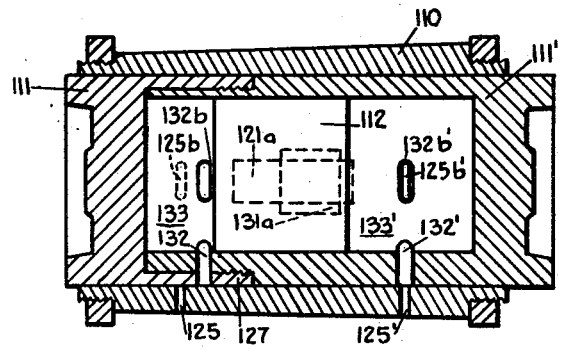
FIG. 4
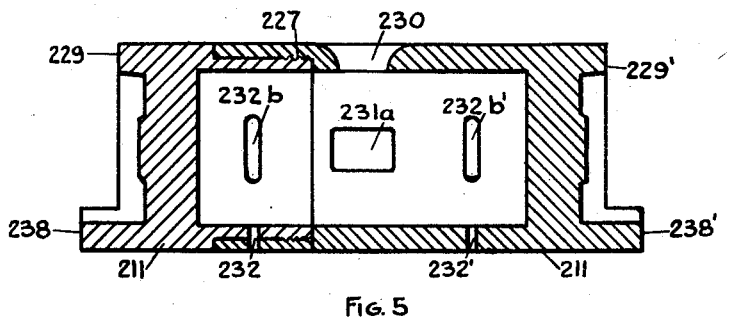
FIG. 5
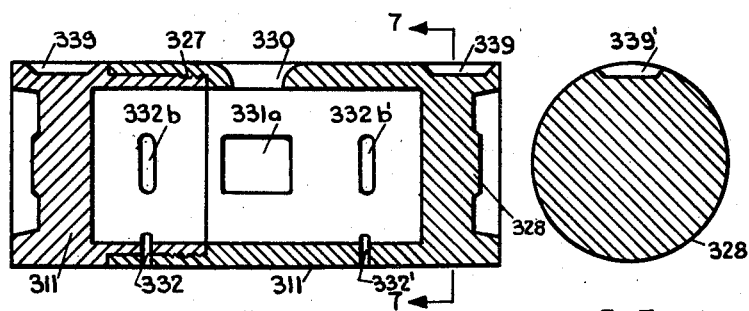 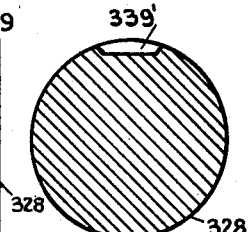
FIG. 6  FIG. 7
Inventor: Willem J. D. Van Dijck
By: Oswald Td Milmore
His Attorney

United States Patent Office 2,814,552
Patented Nov. 26, 1957

2,814,552

RECIPROCATING COMPRESSION-REACTOR FOR SHORT PERIOD, HIGH TEMPERATURE AND HIGH PRESSURE CHEMICAL REACTIONS

Willem J. D. van Dijck, The Hague, Netherlands, assignor to Shell Development Company, San Francisco, Calif., a corporation of Delaware Application January 8, 1951, Serial No. 205,002

Claims priority, application Netherlands January 13, 1950

18 Claims. (Cl. 23—252)

This invention relates to improvements in reciprocating compression-reactors wherein a gas containing or believed to contain a reactant is compressed and promptly thereafter expanded, whereby the reactant is brought for a short time to a high temperature. The invention may be used to perform chemical reactions, such as cracking of hydrocarbons, synthesis reactions, etc., or to determine whether such a reaction occurs when the gas is subjected to high temperature and pressure by compression in a cylinder and subsequent expansion therein. The apparatus is particularly useful for vapor-phase reactions which have to occur in a very short time, e. g., of the order of microseconds up to a few hundredths of a second, in order to avoid undesirable side reactions, but may also be applied to other reactions.

In an earlier, copending patent application, Serial No. 187,986, filed October 2, 1950, by myself and Johannes Jan Broeze, an improved method of operation and certain constructions of such compression-reactors are described and claimed wherein the large amount of work required to compress the gas is recovered as mechanical work of expansion and used directly for compressing another quantity of gas containing a reactant in another cycle, and wherein the additional energy required to compensate for friction and heat losses, etc., to keep the reactor in operation is supplied by injection of a quantity of injection gas at an elevated pressure into the compression chamber at one or more times in the cycle of compression and expansion subsequent to the commencement of the compression. The above patent application also describes and claims a reactor comprising a cylinder with closed ends which is reciprocably mounted on a slide bed with a horizontal axis and contains a free, double-acting piston which divides the cylinder into two compression chambers, the cylinder and slide bed being provided with the necessary ports for admitting and discharging the gas. The piston and cylinder move freely and in opposite directions under the influence of the gases in the compression chambers, which gases act with varying pressures on the end closures of the cylinders and upon the opposed piston faces, so as to expand one compression chamber when the other is contacted. In the reactor, as described and shown in the above patent application, the cylinder is provided with flat external surfaces moving over flat surfaces or faces on the slide bed, for maintaining the cylinder in the proper angular position to bring the various ports therein into registry with the ports in the slide bed.

The instant invention is an improvement over the above-mentioned compression reactor, and it is an object of the invention to provide a compressor-reactor having a reciprocating, closed-ended cylinder containing a double-acting piston wherein the cylinder is or can be made externally circular in cross-section for facilitating the assembly of the cylinder, affording greater strength for a given wall thickness, achieving greater simplicity in construction and realizing other advantages as will appear hereinafter. The invention is not, however, limited to reactors of the type claimed in the aforesaid patent application.

The provision of one or more flat surfaces on the external cylinder face was necessary in the above-mentioned reactor to prevent the cylinder from rotating on the bed about the cylinder axis; such rotation would displace the ports on the cylinder from those on the slide bed and prevent proper registry thereof. The prior arrangement for securing the end closure to the cylinder did not result in a structure of greater strength for the weight of metal utilized because it employed end closures that were threaded or bolted onto the end of the cylinder; some type of removable closure was essential because of the need to gain access to the interior which contained the free piston. For these reasons the cylinder had to be made excessively heavy. It was, further, not practicable to form the cylinder in sections with connecting joints intermediate the cylinder ends because of difficulties in connecting the various sections whilst maintaining a continuously aligned bore for the piston and the smooth exterior supporting surface and, at the same time, providing a joint that has a strength at least of the order of that of the cylinder wall. Strength is significant in view of the high pressure attained, such pressures being often several hundred atmospheres.

According to the present invention, the foregoing difficulties are overcome by forming the reciprocable cylinder to have a center of gravity that is below the center of support afforded by the bed, whereby the metacenter is always above the center of gravity. In the preferred arrangement, at least the part of the external face of the cylinder that is to be in contact with the slide bed is shaped as a cylinder of revolution and the slide bed is provided with a mating supporting surface, whereby the cylinder has a center of support substantially at the axis of said cylinder of revolution, the cylinder being mechanically free to rotate on the slide bed about the said axis; and the cylinder is constructed so that the center of gravity thereof is below the horizontal axis of the said cylinder of revolution, thereby to prevent the cylinder from rotating about its axis on the bed and insuring that the ports are in proper registry during the reciprocation of the cylinder. The desired location of the center of gravity can be attained in several ways, all of which are to be considered as embodiments of this invention, e. g., by forming the cylinder with internal and external surfaces that are cylinders of revolutions with parallel, mutually eccentric axes, the axis of the external cylindrical surface being beneath the other axis, so that the cylinder wall will be thicker at the lower than the upper side of the cylinder wall and/or providing weights in the lower side of the wall, the two surfaces being in this case permissibly coaxial. The simplest and preferred arrangement, however, is to provide the cylinder with coaxial inner and outer surfaces that are cylinders of revolution and to distribute the inlet and outlet ports for the various media over the walls of uniform thickness thus obtained in such a manner as to insure that the center of gravity is below the axis; thus, the ports or at least the larger ports, or most of the ports, may be located above the horizontal plane through the cylinder axis, the various ports being disposed symmetrically about the vertical plane through the axis.

The cylinder can be formed of several separate sections connected intermediate the cylinder ends, e. g., by threads, and the end sections of the cylinder may be formed integrally with the end closures, whereby greater strength is achieved for a given weight.

The invention will be further described with reference to the accompanying drawings forming a part of this specification and showing certain illustrative embodiments, wherein:

Fig. 4 is a longitudinal sectional view showing parts of a reactor according to an alternate construction;

Figs. 5 and 6 are longitudinal sectional views of alternate forms of cylinders, the piston being omitted; and Fig. 7 is a transverse section view taken on line 7—7 of Fig. 6.

Figure 1:
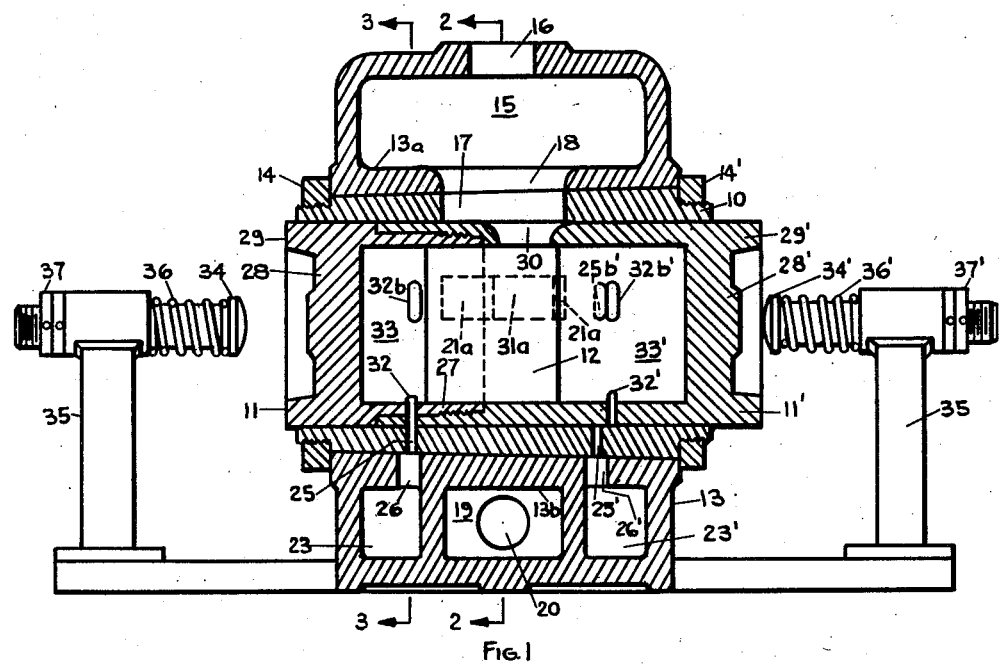
Fig. 1 is a vertical, longitudinal section view of a compression-reactor according to the invention, parts being shown in elevation.
Figure 2:
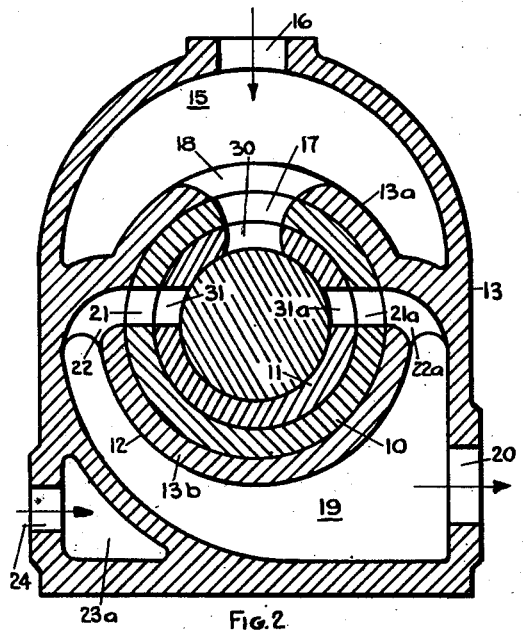
Figs. 2 and 3 are transverse section views taken on correspondingly numbered section lines indicated in Fig. 1.
Figure 3:
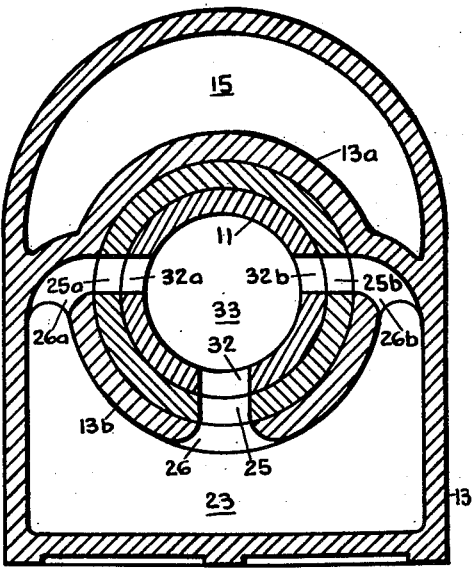

Referring to Figs. 1–3 of the drawings in detail, the compression-reactor comprises three essential, relatively movable parts: a slide bed having a tubular liner 10; a horizontal, reciprocable cylinder 11, 11'; and a double-acting piston 12 freely reciprocable within the cylinder. The liner 10 provides a supporting surface for the cylinder separate from the reactor base or frame 13, and may in certain embodiments be omitted. The parts 10 and 13 are herein collectively designated as the slide bed. It will be noted that the liner 10 is externally slightly tapered for insuring a close fit within a similarly tapered bore in the frame or base 13, to which it is secured by retaining nuts 14, 14' to secure it against rotation as well as axial movement. The internal bore of the liner 10 is a cylinder of revolution having a horizontal axis and the external surface of the reciprocable cylinder 11, 11' is likewise a cylinder of revolution, so as to be rotatable within the liner 10 about the said axis with a close fit. The internal surface of the reciprocable cylinder is likewise a surface of revolution, coaxial with the external surface, to accommodate the piston 12 which is circular in cross-section. It will be understood that these surfaces and the inner surface of the cylinder are provided with grooves or other means for lubricating the surface; since, however, the lubrication system is not a part of this invention it will not be described herein.

The slide bed is of compartmented construction to provide the following channels and port means: (1) channel 15 at the top that communicates with an inlet opening 16 at the top for the gas to be compressed and further communicates with an inlet port 17 in the top of the liner 10 via a port 18 in the partition wall 13a of the base; (2) channel 19 at the bottom that communicates with an outlet opening 20 at the rear for the exit of expanded gas and further communicates with a pair of exhaust ports 21 and 21a in the opposite sides of the liner 10 above the horizontal mid-plane through the axis thereof via ports 22 and 22a in the partition wall 13b of the base; (3) channels 23, 23' located at opposite ends, connected by a longitudinal passage 23a at the front and communicating with an inlet opening 24 for the admission of pressurized injection gas and communicating further with separate, axially spaced groups of ports in the liner 10. Channel 23, at the left, communicates with a vertical port 25 at the bottom of the liner and with two horizontal ports 25a and 25b at opposite sides above the said horizontal mid-plane, via ports 26, 26a and 26b in the partition wall 13b of the base. Similarly, the channel 23' communicates with three correspondingly located ports (of which only 25' and 25b' are represented by the views of the drawings, the third port being symmetrical to port 25b') via ports in the base partition wall, of which only the port 26' appears and the others are located similarly to 26a and 26b. The ports 17, 21 and 21a are located so as to be in communication with the intake and exhaust ports in the cylinder (to be described) at least in those positions of the cylinder at which it is desired to charge or discharge gas into or from the cylinder; in the embodiment shown, wherein the intake and exhaust ports in the cylinder are controlled by the piston 12, the ports 17, 21 and 21a are conveniently longitudinally elongated and continuous from end to end, so as to communicate with their corresponding ports in the cylinder at all positions of the cylinder. As is clearly shown in the drawings, ports 25—25b', inclusive, are longitudinally shorter, and communicate with the injection ports in the cylinder (to be described) only during minor fractions of the cycle of operation.

The cylinder consists of two end sections 11, 11' joined telescopically and threadedly connected at 27. The threaded connection may be of cylindrical, conical or stepped formation. Each end section has an integral end closure 28, 28', preferably somewhat thickened as shown, and preferably further having a cylindrical flange or extension 29, 29' that conforms externally to the external surface of the cylinder and may have a radial wall thickness somewhat in excess of the wall thickness of the part of the cylinder intermediate the closures. These optional flanges contribute greatly to the stiffness of the cylinder ends. The open cavities in these flanges are advantageously polygonal, e. g., hexagonal, for receiving keys for screwing the sections 11 and 11' together. The cylinder is provided with the following ports: an intake port 30 at the top and intermediate the cylinder ends for continuous registry with port 17; a pair of exhaust ports 31, 31a at the sides above the horizontal mid-plane and intermediate the cylinder ends and slightly longer than the port 30 for continuous registry with the ports 21 and 21a, respectively; and injection ports 32, 32a and 32b near the left end for intermittent registry with the ports 25, 25a and 25b, respectively, and three similarly located injection ports near the right end (of which only the ports 32' and 32b' are represented in the views of the drawings) for intermittent registry with the ports 25 and 25b', and with the third port in the liner that is symmetrical to port 25b'. The left section 11 is shorter than the right section 11', so as to place the threaded connection 27 entirely to the left of the main ports 30, 31 and 31a, and to the right of the ports 32, 32a and 32b.

The cylinder construction just described, involving end sections with integral end closures, has certain advantages over one wherein the closures are separate and then attached to a one-piece cylinder as with this last construction the connection between the cylinder end closure and the cylinder wall would be placed under heavy stress. Stiffness is further added by the flanges 29, 29'.

It will be evident that, by mounting all of the ports in the cylinder except the lower injection ports 32 and 32' above the horizontal mid-plane of the cylinder, the center of gravity of the cylinder will be situated below the said mid-plane; accordingly, the cylinder will not display a tendency to rotate about its horizontal axis when the cylinder moves in an axial direction, which rotation would interfere with the correct juxtapositioning of the various ports and would prevent communication or complete communication between the channels of the frame 13 and the interior of the cylinder. By relying on the low center of gravity to orient the cylinder about the horizontal axis no external guide pieces are required, the cylinder wall can be made uniformly thick to stress the metal forming the wall uniformly about the circumference, and the joining of the sections by threads is facilitated.

It should be noted that, as shown in Figs. 2 and 3, the various ports are symmetrical with respect to the vertical, longitudinal midplane of the cylinder. Thus, the ports 17, 18, 25, 25', 26, 26', 30 and 32 have vertical axes lying in the plane of symmetry; ports 31, 21 and 22 are located symmetrically to the ports 31a, 21a and 22a, respectively; and ports 32a, 25a and 26a are located symmetrically to the ports 32b, 25b and 26b. (Similarly, ports 32b', 25b' and the supply ports in the bed are symmetrical to the ports on the opposite side of the cylinder that also communicate with the channel 23', which, however, do not appear on the drawing.) This symmetry applies not only to the locations of the axes of the ports but also to their shapes; for example, it is seen from Figs. 2 and 3 that the opposite walls of the upper vertical ports 17, 18 and 30, as well as the lower vertical ports 25, 26 and 32, are symmetrical with respect to the said vertical plane. Such a symmetrical arrangement and shape is highly advantageous to avoid asymmetrical gas flow which would produce a torque tending to rotate the cylinder by the impulse of the entering gas and reaction of the discharging gas. When greater symmetry of gas flow is achieved it is possible to use a smaller eccentricity for the mass and the external surface of the cylinder. Symmetrical gas flow can sometimes be further promoted by streamlining the ports, as is shown for the vertical ports, thereby reducing disturbances to the flow of gas, but this streamlining is not essential. The symmetry is continued outwardly from the cylinder as far as practicable. When this is not feasible, e. g., in the case of the channel 19, the shape is as shown to cause the resistance to the discharge of gas from the port 22 to be substantially equal to that to discharge through the port 22a.

The piston 12 is sufficiently long to cover the intake and exhaust ports in the center of the cylinder when the parts are in an intermediate position, as shown in Fig. 1; it divides the interior of the cylinder into expansible compression chambers 33 and 33', it being evident that one of these chambers is expanded while the other is being contracted when the piston moves relatively to the cylinder. Near the end of each expansion, one end of the piston uncovers the ports 30, 31 and 31a, placing the expanded chamber 33 or 33', as the case may be, into communication with the channels 15 and 19. Because the ports 31 and 31a are slightly longer than port 30 communication with the discharge channel 19 is established first.

If desired, one or more buffers 34, 34', reciprocably mounted on stationary brackets 35, 35', carried by the frame 13 and provided with shock absorbing springs 36, 36', may be adjustably located by means of nuts 37, 37' just beyond the normal limits of travel and in alignment with the cylinder to insure that the cylinder moves equal distances to the right and left of its center position on the slide bed. In was found in actual operation that the cylinder 11, 11' reciprocates symmetrically without touching the buffers, so that these may be regarded primarily as optional safety devices.

The operation of the device will be described only briefly with reference to one specific embodiment; for a more detailed discussion of the method, including preferred physical properties of the gas and reactants, reference is made to the aforesaid earlier patent application. The two chambers 33 and 33' pass through similar cycles of contraction and expansion but operate 180° out of phase with one another. The cylinder 11, 11' and piston 12 move always in opposite directions with respect to the slide bed; the lengths of their strokes are inversely proportional to their masses.

Reciprocation is initiated by hand, for example by moving the cylinder to a position with the port 32' in registry with the pressurized gas port 25'. The inflow of gas raises the pressure within chamber 33' in relation to that in the chamber 33, whereby the pressure acting on the inner face of the closure 28' exceeds that acting on the inner face of the closure 28, and the cylinder moves toward the right; similarly, the pressure acting on the right piston face exceeds that acting on the left piston face, and the piston moves toward the left. These movements accelerate until the pressures in chambers 33 and 33' are equal; they continue beyond this instant with deceleration because of inertia. Hence the gas in the chamber 33 is compressed while that in the chamber 33' is expanded.

When the cylinder is at the extreme right and the piston at the extreme left of the respective travel, the left chamber 33 is fully contracted and the right chamber 33' is fully expanded and all six injection ports 32—32b' are out of registry with the ports in the slide bed, the three ports 32, 32a and 32b being further covered by the piston. The piston exposes ports 30, 31 and 31a and places them in communication with the right chamber 33'. Reaction gas under high temperature and pressure which has undergone or is undergoing reaction is in the chamber 33 while expanded gas is leaving the chamber 33' through the uncovered side ports channel 19 and outlet 20 and fresh feed gas to be treated is entering the latter chamber uncovered upper ports from channel 15 and inlet 16. The entering gas scavenges the compression chamber. This feed gas may be the gas or gas mixture to be reacted or an inert carrier gas with which the reactant is mixed or, if the latter is liquid or solid, the feed gas may be an aerosol. It will be understood that the inert carrier gas is preferably one having a high valve of the constant $k$ which is the ratio of $C_p$ (the specific heat of the gas at constant pressure) to $C_v$ (the specific heat of the gas at constant volume), or at least a $k$ value that exceeds that of the reactant, it being desirable to attain as high a temperature as possible by compression under conditions as nearly adiabatic as practicable with the lowest possible pressure. For example, steam nitrogen, helium, mercury vapor, etc., may be used as a carrier gas, depending upon the temperature to be attained. Steam is often very useful, particularly when hydrocarbons are to be cracked because the $k$ value of steam, although relatively low, is considerably higher than that of the heavier hydrocarbons.

In the next stroke the compressed gas in the left chamber 33 accelerates the cylinder to the left and the piston to the right, thereby starting the compression stroke in the right chamber 33'. Early in this stroke the piston 12 covers the ports 30, 31 and 31a, thereby ending the admission and exhaust of the gases at the right. This acceleration of cylinder and piston continues until the pressure in chamber 33 equals that in chamber 33', at which moment the piston and cylinder attain their maximum velocities and are approximately in their mid positions. Thereafter the kinetic energy stored in these moving parts causes the stroke to continue with deceleration, until both cylinder and piston stop at the opposite ends of their strokes, with the gas in the chamber 33 fully expanded and that in the chamber 33' fully compressed. Compression of the latter raises the temperature thereof to bring about the desired chemical reaction, the reaction beginning near the end of, e. g., just prior to or at the end of, the compression stroke. Just before the end of this stroke the left end of the piston 12 uncovers the ports 30, 31 and 31a, placing them into communication with the left chamber 33 and permitting exhaust of the expanded gas from, and influx of fresh feed gas into, this chamber. In the subsequent stroke these operations are repeated in the reverse direction.

It is evident from the foregoing operation that the work done by the gas in the expansion in one chamber, that is, the expansion energy, is recovered as mechanical work and applied directly for compressing gas in another cycle in the other compression chamber. If the reactor were frictionless and the compression and expansion truly adiabatic, the reactor would continue to operate without any external driving force if the chemical reaction were not endothermic. Since, however, these two conditions are not both realized in practice, the reactor will continue to operate only with moderately and highly exothermic reactions. In most cases some additional energy must be supplied to the system.

This additional mechanical energy, when needed, is conveniently supplied in the form of an injection gas, which is a gas compressed to a suitable pressure and introduced into the compression chamber at one or more times during the cycle of compression and expansion subsequent to the commencement of the compression stroke. Introduction necessarily takes place at a pressure exceeding that of the gas in the chamber at the moment of injection, and, in order to avoid having to pressurize the compression gas to a great pressure, injection is usually effected some time before or after "top dead center." Injection of the gas into the chamber raises the pressure therein and expansion of the injection gas during the expansion stroke, together with the other gases in the chamber, contributes to the mechanical work of expansion. The injection gas may be any gas that is compatible with the gas being treated and may have the some composition.

In the embodiment described above, injection gas is supplied to the channels 23 and 23' and is introduced into each of the compression chambers twice in each cycle, i. e., once during the compression and once during the expansion; it is evident that, by the use of valves, it is possible to cause injection in some other manner, e. g., only during the expansion stroke, as described in the aforesaid earlier joint patent application. Reverting now to the stroke of the piston and cylinder that was described in detail above, starting with the cylinder at the right and the piston at the left, the injection ports 32, 32a and 32b of the left chamber 33 are uncovered by the piston early in the stroke, but they are not placed into communication with the channel 23 until later in the stroke, e. g., almost the midpoint, when the parts have the position shown in Figs. 1 and 3; in this position these ports are juxtaposed to ports 25, 25a and 25b, and injection gas is admitted into the chamber 33 for a small fraction of the expansion part of the cycle until these ports move out of registry, raising the pressure therein. The expansion of the injected gas during the subsequent portion of the expansion strokes supplies mechanical work. A little later in this stroke, after injection into chamber 33 has been interrupted, the three injection ports 32'—32b' of chamber 33' will move into registry with the corresponding ports 25'—25b'; this occurs before the piston 12 covers the injection ports of chamber 33', so that injection gas is admitted also into this chamber during this stroke. Although injection gas introduced during compression is further compressed, it nevertheless supplies energy upon the subsequent expansion. It is evident that the injection ports and the channels for supplying injection gas may in certain cases be omitted, e. g., when the reaction is sufficiently exothermic to provide all energy necessary to compensate for heat and friction losses.

The reactor can be started by admitting injection gas. Thus, the cylinder can be moved manually to the position shown in Fig. 1, and the piston therein made to occupy a position with injection ports uncovered by moving the cylinder rapidly or slowly, as required, to take advantage of the inertia of the piston and friction between the piston and cylinder. When injection gas under pressure is now admitted from channel 23 into the left chamber 33, the gas forces the cylinder to the left and the piston to the right, placing the machine into operation. An equilibrum position intermediate the buffers 34, 34' is readily attained.

The instant invention is not limited to any specific arrangement of the intake, exhaust and injection ports, and it is evident that the provision of a low center of gravity in the reciprocable cylinder that is externally supported by the slide bed along a cylinder of revolution finds application as well in reactors wherein different port arrangements are used, such as the above-noted omission of the injection ports or the omission of the medial intake port and the supply of all feed gas at moderately high pressure through the injection ports. The latter variant is further shown in Fig. 4, described below.

The reactor described has a characteristic frequency which depends upon the masses of the cylinder and piston and the compression ratio, the latter being determined in turn by the time of opening of the exhaust ports and the energy supplied by the injection gas. The actual attained frequency of operation may be less than the characteristic frequency and will increase as more injection gas is introduced to approach the characteristic frequency.

It is evident that the frequencies and compression ratios can be selected to fit a desired time of reaction and temperature required for a specific chemical reaction, and the following data are presented merely to indicate, without limiting, certain operating conditions: The reactor may be operated with compression ratios of from about 20 to 1 to about 200 to 1, and the pressure at the end of the compression may reach a maximum of the order of 500 atmospheres, producing temperatures of several thousand degrees F., depending on the $k$ value of the gas. The frequencies may be of the order of 2,000 to 10,000 cycles per minute, and the reaction time may be of the order of microseconds up to several hundredths of a second. The high pressure injection gas may be supplied at a pressure of about four to twenty atmospheres.

Fig. 4 shows a modification wherein the bore of the cylinder is eccentric and above the exterior cylindrical surface, and wherein no medial intake port is provided, the injection ports being used as intake ports. Reference numbers, increased by 100, designate parts corresponding to those previously described. The cylinder consists of two sections 111, 111', threadedly connected at 127. In this embodiment the intake port 30, chamber 15 and inlet 16 are omitted, and the injection ports 132—132b' in the cylinder and the ports 125—125b' in the slide bed, which communicate with channels 23 and 23', are somewhat longer in an axial direction to remain in registry for a greater fraction of the stroke for passing the somewhat greater quantities of gas required because of the omission of the medial intake port. The ports 125—125b' in the slide bed are spaced apart farther so as to inject injection gas nearer to the low pressure part of the cycles, so as to avoid the need to pressurize the large amounts of gas to excessively high pressures. The injection and exhaust ports at the sides need not be located above the horizontal mid-plane, but may be located at the mid-height, as shown.

The port arrangement according to the device of Fig. 4 is preferably used when the reactant is highly diluted in an auxiliary carrier gas, e. g., with two to ten parts of an inert carrier gas having a high $k$ value for each part of reactant. This mixture may be compressed to moderate pressures and fed to the inlet to channels 23 and 23', from which it enters the compression chambers twice during each cycle. For example, assume the reactor to be in the position shown in Fig. 4 and that the left chamber 133 is undergoing expansion and is accelerating the piston to the right and the cylinder to the left; the piston has just covered the exhaust ports near the center and the injection ports of the chamber 133' are in registry with the corresponding ports in the slide bed. In the immediately preceding position most of the expanded gas was exhausted, but a part thereof remained in the chamber 133'; this remnant gas was, in the part of stroke just prior to the point shown in Fig. 4, compressed to a small degree. The gas from channel 23 now enters the chamber 133' and is compressed therein during the continued stroke. Just as the injection ports of chamber 133' pass out of juxtaposition with the slide bed ports the injection ports 132—132b of the chamber 133 move into registry with the slide bed ports 125—125b, thereby permitting pressurized gas to enter chamber 133 to boost the pressure therein and supply additional energy required to maintain the machine in operation. The operation is otherwise as was explained for Figs. 1–3.

It should be noted that the modifications illustrated in Fig. 4 are individually applicable to the other embodiments and are not necessarily employed together.

Fig. 5 shows a cylinder similar to that of Fig. 1, with coaxial bore and exterior, but having weights at the bottom to produce or aid in producing a lowered center of gravity. The cylinder consists of sections 211, 211', threadedly connected at 227 and having intake and exhaust ports 230, 231a, and injection ports 232—232b', it being understood that there would be ports symmetrical to the ports 231a, 232b and 232b'. The integral flanges 229, 229' at the cylinder ends have extensions 238, 238', at the bottom; these may be formed integrally with the cylinder sections as shown and constitute weights for lowering the center of gravity.

Figs. 6 and 7 show a further form having cavities at the top to produce or assist in producing a lowered center of gravity. The cylinder sections 311 and 311', threadedly joined at 327, and provided with ports 330, 331a, 332—332b', etc., have grooves 339 and 339' at the top, forming open cavities. Besides lessening the weight at the top of the cylinder these grooves may serve as channels for lubricant.

I claim as my invention:

1. A free piston machine of the type described having, in combination: a slide bed having a substantially horizontal, upwardly directed cylindrical supporting surface; a cylinder having closed end walls and a bore mounted for reciprocation on said bed, said cylinder being externally a cylinder of revolution and having a center of gravity below the axis of said cylinder of revolution; a free piston within said bore; intake and exhaust ports in the wall of said cylinder; and conduit means associated with said bed having port means located to register with said intake and exhaust ports in the cylinder.

2. A machine according to claim 1 wherein the cylinder has an annular flange at each end thereof projecting beyond the end wall of the cylinder.

3. A machine according to claim 1 wherein the cylinder is formed of a plurality of sections threadedly connected together end to end, said sections including at least two end sections each having a tubular part extending toward the other end of the cylinder and one of said end walls formed integrally with said tubular part.

4. As a sub-combination, a reciprocable tubular cylinder for free-piston machines having at least at the bottom thereof an external cylindrical surface of revolution for axial reciprocation on a slide bed and having a cylindrical bore to contain a free piston for reciprocation therein comprising a plurality of sections threadedly connected together end to end, said sections including at least two end sections each having a tubular part extending toward the other end section and an end wall integral with said tubular part, and intake and exhaust ports for said cylinder.

5. A cylinder according to claim 4 wherein the said end portions have integral annular flanges extending outwardly from said end walls, said flanges having their radially outer surfaces shaped in prolongation of the said tubular parts and being thickened radially inwardly to have a wall thickness in excess of that of said tubular parts.

6. As a sub-combination, a reciprocable cylinder for free-piston machines comprising a plurality of sections connected together end to end and shaped to provide a composite structure that has externally a cylindrical surface of revolution for axial reciprocation on a slide bed and has a bore adapted to contain a free piston for reciprocation therein, said composite structure having a center of gravity that is eccentric to the axis of said surface of revolution, said sections including two end sections each having an end wall for the cylinder and an integral tubular part extending toward the other end section, and intake and exhaust ports through the side wall of said cylinder.

7. A reciprocating compression-reactor for subjecting a gas for a short time to high temperature reaction conditions by compressing a gas containing a reactant in a compression chamber and thereafter expanding the gas in the chamber, comprising: a slide bed having a substantially horizontal concave supporting surface; an axially reciprocable tubular cylinder with a substantially horizontal axis having closed ends slidably supported by the bed on said surface thereof; a double-acting piston within said reciprocable cylinder disposed for reciprocation therein defining an expansible compression chamber between each closed cylinder end and the respectively adjacent end of the piston; intake and exhaust ports in the wall of said cylinder for admitting gas into said compression chambers and for exhausting expanded gas from said chambers; and channels in said slide bed having port means located to register with said intake and exhaust ports in the cylinder; the supporting surface of the slide bed and at least the part of the external surface of the reciprocable cylinder that is in contact with the slide bed being shaped as mating cylinders of revolution and the center of gravity of the reciprocable cylinder being situated below the axis of said cylinder of revolution.

8. A reciprocating compression-reactor according to claim 7 wherein the internal and external surfaces of the reciprocable cylinder are complete, coaxial cylinders of revolution, whereby the wall thickness of the said cylinder is circumferentially uniform, and the said ports are distributed in such a manner that the center of gravity of the uniformly thick walls is below the cylinder axis.

9. A reciprocating compressor-reactor according to claim 8 wherein the said surface of the slide bed extends to above the horizontal plane through the cylinder axis, the said port means are located in the slide bed above the said horizontal plane, and the registering inlet and outlet ports in the reciprocable cylinder are located above the said horizontal plane.

10. A reciprocating compression-reactor according to claim 8 wherein the reciprocable cylinder is provided at least at one end thereof with a weight attached below the axis thereof, thereby resulting in a center of gravity below the said axis of the external cylindrical surface.

11. A reciprocable compression-reactor according to claim 7 wherein the external and internal surfaces of the reciprocable cylinder are complete, mutually eccentric cylinders of revolution with the axis of the internal cylindrical surface above and substantially parallel to the axis of the external cylindrical surface, whereby the wall thickness of the reciprocating cylinder is less at the top than at the bottom, thereby lowering the center of gravity thereof.

12. A reciprocable compression-reactor according to claim 7 wherein the reciprocable cylinder is provided with at least one weight below the axis of the said mating cylinders of revolution, thereby lowering the center of gravity of the reciprocating cylinder.

13. A reciprocable compression-reactor according to claim 7 wherein the reciprocable cylinder is provided with at least one cavity above the axis of said mating cylinders of revolution, thereby lowering the center of gravity of the reciprocating cylinder.

14. A reciprocating compression-reactor according to claim 7 wherein the cylinder is formed of a plurality of sections including two end sections, each end section having an end wall and tubular cylindrical part integral with the end wall and extending toward the other end section, the several sections being joined together intermediate the cylinder closures.

15. A reciprocating compression-reactor according to claim 14 wherein the several cylinder sections are threadedly connected.

16. A reciprocating compression-reactor according to claim 15 wherein the cylinder walls extend axially outwardly beyond the end walls to provide integral flanges at each end of the cylinder.

17. A reciprocating compression-reactor for subjecting a gas for a short time, to high temperature reaction conditions by compressing a gas containing a reactant in a compression chamber and thereafter expanding the gas in the chamber, comprising: a slide bed having a concave supporting surface that is a cylinder of revolution with a substantially horizontal axis; a substantially freely reciprocable cylinder with an external surface that is a cylinder of revolution conforming to said supporting surface and having a cylindrical bore and closed ends slidably supported by the bed on said surface, said cylinder having a center of gravity below the axis of said cylinder of revolution; a free, double-acting piston within said bore of the reciprocable cylinder defining an expansible compression chamber between each closed cylinder end and the corresponding end of the piston; intake and exhaust ports in the wall of the cylinder for admitting gas into said compression chambers and for exhausting expanded gas from said chambers; and channels in said slide bed having port means located to register with said intake and exhaust ports in the cylinder.

18. A reciprocating compression-reactor for subjecting a gas for a short time to high temperature reaction conditions comprising a slide bed having a longitudinal recess with a surface that is a cylinder of revolution having a horizontal axis; a reciprocable cylinder with a cylindrical bore and closed ends having an external surface that is a cylinder of revolution and having a center of gravity beneath the axis of said cylindrical surface mounted for substantially free axial reciprocation in said recess; a substantially freely reciprocable, double-acting piston within said bore of the cylinder defining separate compression chambers between the respective closed ends of the cylinder and the opposite ends of the piston, whereby one of said chambers is expanded when the other is contracted upon movement of the piston and cylinder in opposite directions to that of the cylinder for alternately compressing and expanding gas in said chambers; an exhaust channel in the slide bed having port means adjacent the cylinder; exhaust port means in the cylinder for exhausting expanded gas from each chamber when the chamber is expanded and to register with said port means in the slide bed at least when the respective chamber is expanded; an injection gas supply channel in the slide bed having supply port means adjacent the cylinder; and injection port means in the cylinder disposed to be out of registry with the supply port means when the respective chamber is fully expanded and to move into registry with the supply port after partial contraction of the respective chamber by movement of the cylinder and piston in opposite directions, for admitting injection gas at an elevated pressure into each chamber subsequently to commencement of the contraction thereof.

References Cited in the file of this patent

UNITED STATES PATENTS

| | | |
|---|---|---|
| 1,036,288 | Matricardi | Aug. 20, 1912 |
| 1,422,038 | Day | July 4, 1922 |
| 1,586,508 | Brutzkus | May 25, 1926 |

FOREIGN PATENTS

| | | |
|---|---|---|
| 479,518 | Great Britain | Feb. 3, 1938 |